US008570281B2

(12) United States Patent
Black

(10) Patent No.: US 8,570,281 B2
(45) Date of Patent: Oct. 29, 2013

(54) METHOD AND APPARATUS FOR MULTI-TOUCH SURFACE INTERACTION FOR A FINANCIAL APPLICATION WITHIN A BANK BRANCH

(75) Inventor: Jonathan S. Black, Dundee (GB)

(73) Assignee: NCR Corporation, Duluth, GA (US)

( * ) Notice: Subject to any disclaimer, the term of this patent is extended or adjusted under 35 U.S.C. 154(b) by 934 days.

(21) Appl. No.: 12/491,875

(22) Filed: Jun. 25, 2009

(65) Prior Publication Data

US 2010/0328225 A1 Dec. 30, 2010

(51) Int. Cl.
*G06F 3/041* (2006.01)
*G06F 7/04* (2006.01)
*G06F 17/30* (2006.01)
*G06F 17/00* (2006.01)
*G06F 17/20* (2006.01)
*G06F 3/00* (2006.01)
*G06F 3/048* (2013.01)
*H04L 9/32* (2006.01)
*H04N 7/16* (2011.01)

(52) U.S. Cl.
USPC ............. 345/173; 713/168; 713/176; 726/26; 715/224; 715/748; 715/764

(58) Field of Classification Search
None
See application file for complete search history.

(56) References Cited

U.S. PATENT DOCUMENTS

| 6,907,300 B2* | 6/2005 | O'Mahoney et al. ......... 345/173 |
| 2002/0019937 A1* | 2/2002 | Edstrom et al. ............... 713/168 |
| 2007/0132768 A1* | 6/2007 | Podnar et al. .................. 345/520 |
| 2008/0198138 A1* | 8/2008 | McFarlane et al. ........... 345/173 |
| 2009/0025087 A1* | 1/2009 | Peirson et al. ................. 713/193 |
| 2009/0313132 A1* | 12/2009 | McKenna et al. ............... 705/21 |
| 2010/0043061 A1* | 2/2010 | Martin et al. ...................... 726/4 |
| 2010/0058182 A1* | 3/2010 | Jung ............................. 715/702 |
| 2010/0304729 A1* | 12/2010 | Sabotta et al. ................ 455/415 |
| 2010/0312725 A1* | 12/2010 | Privault et al. .................. 706/12 |

* cited by examiner

Primary Examiner — Bipin Shalwala
Assistant Examiner — Ryan A Lubit
(74) Attorney, Agent, or Firm — Michael Chen

(57) ABSTRACT

A method and apparatus for operating a computing device including a multi-touch surface. The method comprises: presenting a customer with an application form; transferring data from a customer's portable device (such as a cellphone) placed on or near the multi-touch surface to the application form; communicating with an authorization portable device (such as a staff identification badge) placed on or near the multi-touch surface by an authorized user; and transferring data from the authorization portable device to the application form to complete the application form.

17 Claims, 4 Drawing Sheets

METHOD AND APPARATUS FOR MULTI-TOUCH SURFACE INTERACTION FOR A FINANCIAL APPLICATION WITHIN A BANK BRANCH

FIELD OF THE INVENTION

The present invention relates to a method and apparatus for multi-touch surface interaction.

BACKGROUND OF THE INVENTION

A multi-touch surface computing device (hereinafter a "multi-touch computer") has been developed by Microsoft Corporation (trade mark) and is available as an interactive table. This interactive table can image objects placed thereon and support interactions from multiple users simultaneously.

This multi-touch computer has applicability to various business applications, but additional security is required for use in financial applications or other applications transferring personal or private data.

SUMMARY OF INVENTION

Accordingly, the invention generally provides methods, systems, apparatus, and software for a multi-touch surface computing device transferring personal data.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects of the invention may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of operating a computing device including a multi-touch surface, the method comprising: presenting a customer with an application form; transferring data from a customer's portable device placed on or near the multi-touch surface to the application form; communicating with an authorization portable device placed on or near the multi-touch surface by an authorized user; and transferring data from the authorization portable device to the application form to complete the application form.

The step of presenting a customer with an application form may be implemented by displaying a representation of the form on a portion of the multi-touch surface.

The customer's portable device may be a cellular radiofrequency telephone (a "cellphone"), a portable digital assistant (PDA), an integrated circuit card, an intelligent key fob, or any other convenient token. The token may include a processor (that is, it could be an intelligent token), or it may merely store a unique code.

The authorization portable device may be a cellphone, a PDA, an integrated circuit card (such as a staff identification card), an intelligent key fob, or any other convenient token.

The customer's portable device may include a sharing facility to allow the customer to populate personal information on a template (similar to a business card) that can be transferred by the customer to authorized applications. The personal information may include the customer's full name, address, postcode, bank details, gender, date of birth, marital details, credit history, and the like. A restricted version of the template (with non-sensitive information) may be available for transfer to non-authorized applications.

The step of transferring data from a customer's portable device placed on or near the multi-touch surface to the application form may be implemented by the multi-touch surface displaying an image of the template containing personal information (for example as a business card), and transferring data from the image to the application form in response to the customer dragging the image to an image of the application form.

The sub-step of displaying an image of the template containing personal information may allow the customer to selectively add or remove data from the image.

The method may comprise the further step of the multi-touch surface wirelessly communicating with the customer's portable device.

The step of the multi-touch surface wirelessly communicating with the customer's portable device may be initiated prior to the customer placing the portable device on the multi-touch surface.

The step of communicating with an authorization portable device placed on or near the multi-touch surface by an authorized user may include the step of verifying a claimed identity of a user of the authorization portable device. The step of verifying a claimed identity of a user of the authorization portable device may include requiring the user to enter a code (such as a personal identification number (PIN) or password).

The method may further comprise the step of validating that the form has been completed by checking that every required field has been completed. In the event that one or more required fields have not been completed, the method may include highlighting any incomplete required fields, and then providing a keyboard for allowing the customer or an authorized person to complete the incomplete required fields.

The method may further comprise printing a physical copy of the completed application form and/or storing an electronic version of the completed application form in the customer's portable device or in a network-based store accessible by the customer's portable device or another network device available to the customer. When the completed application form is stored on a network, a conventional authentication scheme may be implemented to provide secure access to the completed application form.

The step of storing an electronic version of the completed application form in the customer's portable device may include storing the electronic version in a secure area of the customer's portable device. The secure area may require a passcode to be entered to access data in the secure area. A passcode entry zone may be displayed on the multi-touch surface to enable the customer to enter a passcode for accessing the secure area within the customer's portable device. The passcode may be encrypted with a public key then transmitted to the customer's portable device for decryption by a private key held within the customer's portable device.

The method may include the further step of allowing a second customer to provide information for the application form by providing a second customer portable device, which transfers personal information in a similar way to the first customer portable device. In this way, multiple customers can jointly submit an application, for example, where two customers want to take out a mortgage in their joint names.

By virtue of this aspect, a customer is able to pre-stage a transaction, or partly complete an application form, and then wait for a staff member to come and complete the application, or the customer can go to a self-service terminal to perform another stage of (or even complete) the transaction.

According to a second aspect there is provided apparatus for jointly completing an application using a multi-touch surface, the apparatus comprising: a computer; a multi-touch surface in communication with the computer; a communication facility coupled to the computer and for communicating between the computer and portable devices in the vicinity of the multi-touch surface; wherein the computer includes an application arranged to receive data transferred from a customer's portable device and from an authorized portable device, and to create an application form populated with data received from both the customer's portable device and the authorized portable device.

The application may provide a customer with a locked application form that a member of staff may unlock using an authorized portable device, such as a staff identification card.

By virtue of this aspect, apparatus is provided that allows multiple people to interact jointly on the same transaction, each person performing part of the transaction. The multiple people may include multiple customers and one or more staff members.

According to a third aspect there is provided a network of multi-touch surface computing devices installed within a branch, each multi-surface computing device being operable to allow a customer to prepare an application by transferring data from a customer portable device to the multi-touch surface computing device, which auto-populates the application, and receives data from an authorization portable device brought into the vicinity of the multi-touch surface computing device to complete the application.

According to a fourth aspect there is provided a portable device having software arranged to operate in conjunction with a multi-touch surface computing device, the portable device comprising: a two-dimensional, visual identification provided on a rear side of the portable device for reading by the multi-touch surface computing device; an electronic identifier associated with the two-dimensional, visual identification; a short-range, wireless communication facility for communicating the electronic identifier to the multi-touch surface computing device; and stored personal information associated with a user of the portable device for transfer to the multi-touch surface computing device by the short-range, wireless communication facility.

These and other aspects will be apparent from the following specific description, given by way of example, with reference to the accompanying drawings.

DETAILED DESCRIPTION

Figure 1:
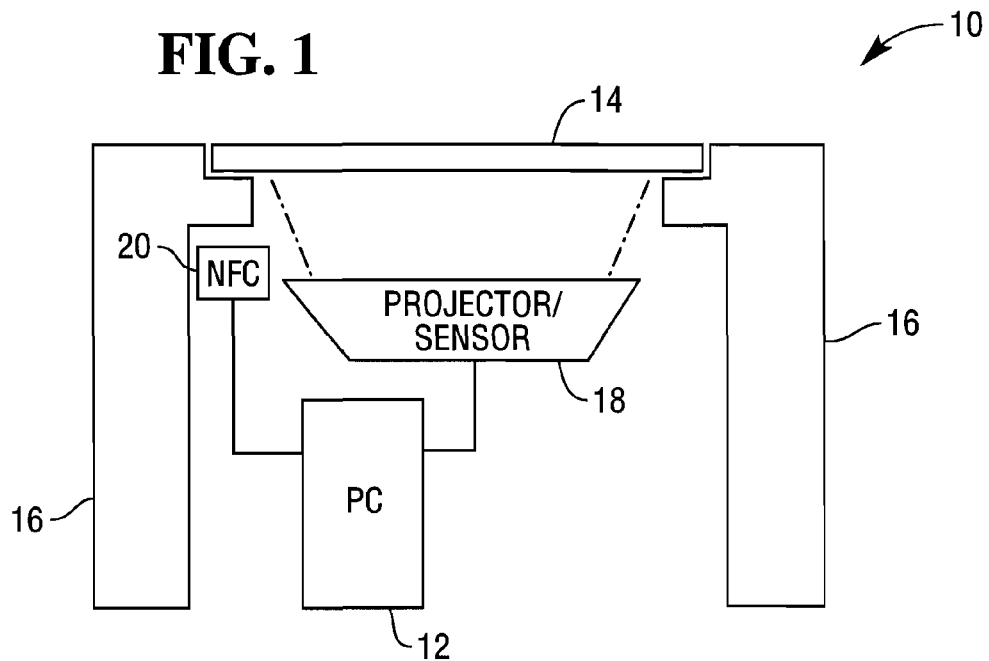
FIG. 1 is a simplified pictorial diagram of a multi-touch surface computing device in accordance with an embodiment of the present invention.

Reference is first made to FIG. 1, which is a simplified pictorial diagram of a multi-touch surface computing device (hereinafter a "multi-touch computer") 10 located in a bank branch in accordance with an embodiment of the present invention.

The multi-touch computer 10 comprises a computer 12; a translucent surface 14 mounted horizontally as an inset on a table 16; a combined projector/position sensor unit 18, and a near-field communications (NFC) wireless transceiver 20 coupled to the computer 12.

The translucent surface 14 and combined projector/position sensor unit 18 are available from Microsoft Corporation, Redmond, Wash., and are similar to those described in US patent application number 2007/0188444 (assigned to Microsoft Corporation).

The NFC transceiver 20 is an ACR122 NFC contactless smart card reader available from Advanced Card System Limited (trade mark), Units 2010-2013, 20th Floor, Chevalier Commercial Centre, 8 Wang Hoi Road, Kowloon Bay, Hong Kong, although any other convenient NFC transceiver (or other short range RF transceiver) would be satisfactory. The NFC transceiver 20 couples to a conventional USB port within the computer 12.

Figure 2:
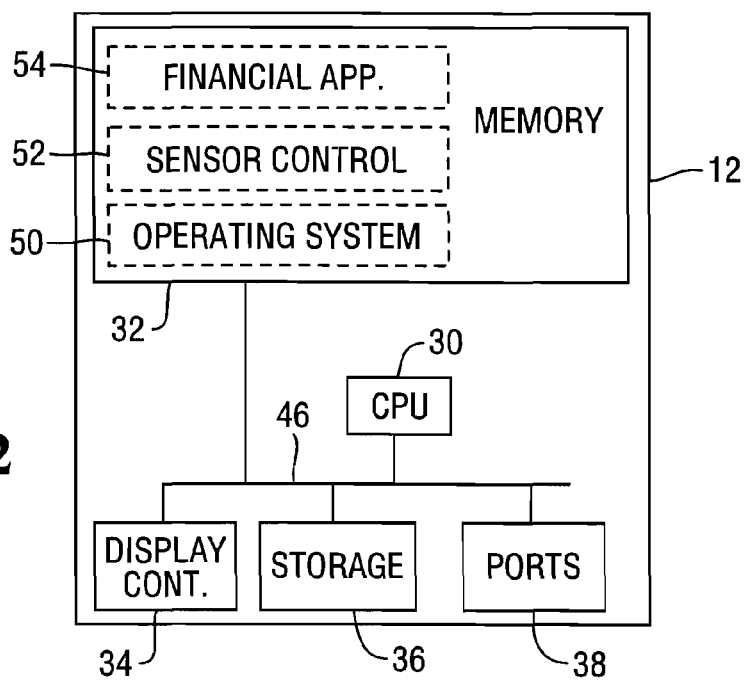
FIG. 2 is a simplified schematic diagram of a part (the computer) of the multi-touch surface computing device of FIG. 1, illustrating components thereof in more detail, in particular, a software component (the financial application) requiring joint input from a customer and an authorized person to complete an application.

The computer 12 is a standard personal computer, as shown schematically in FIG. 2, with additional software components loaded therein.

The computer 12 comprises one or more processors 30 coupled to connection 46 to a memory 32, a display adapter (in the form of a graphics card) 34, a storage device (in the form of a magnetic disk drive) 36, and serial ports 38 supporting universal serial bus (USB) connections.

The memory 34 includes an operating system kernel 50, a sensor control application 52, and a financial application 54 for automatically creating a form from a stored template and populating the form with information received via the NFC transceiver 20.

In this embodiment, the sensor control application 52 is provided by Microsoft Corporation and is used for (i) imaging objects in proximity to (which includes contact with) the translucent surface 14, and (ii) providing the operating system kernel 50 with co-ordinates of a point or points on the translucent surface 14 touched by a user (the customer or a member of staff).

Figure 3A:
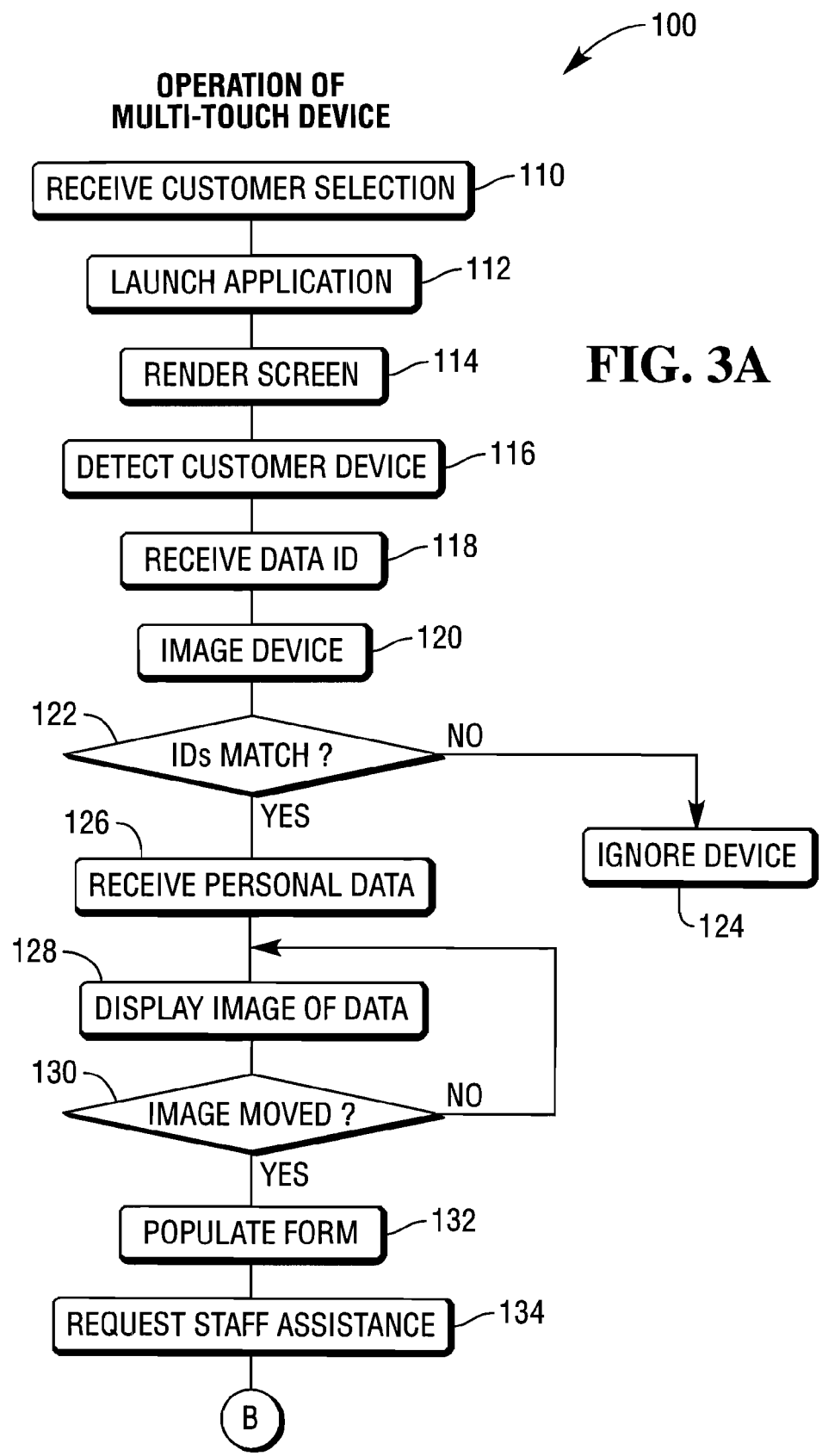
FIGS. 3A and 3B comprise a flowchart illustrating steps involved in jointly completing an application form created by the financial application of FIG. 2 using the multi-touch surface computing device of FIG. 1.
Figure 3B:
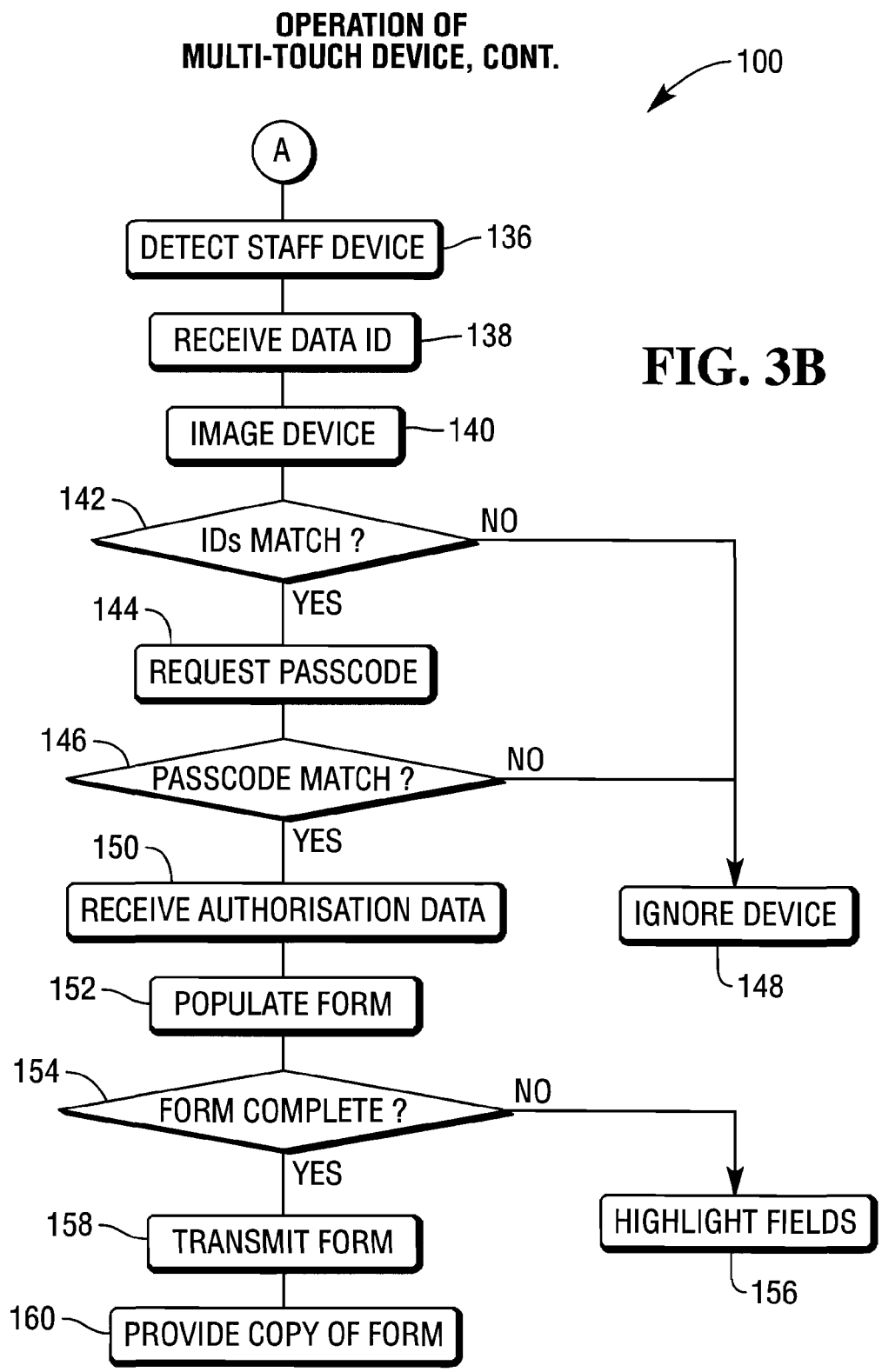
Figure 4:
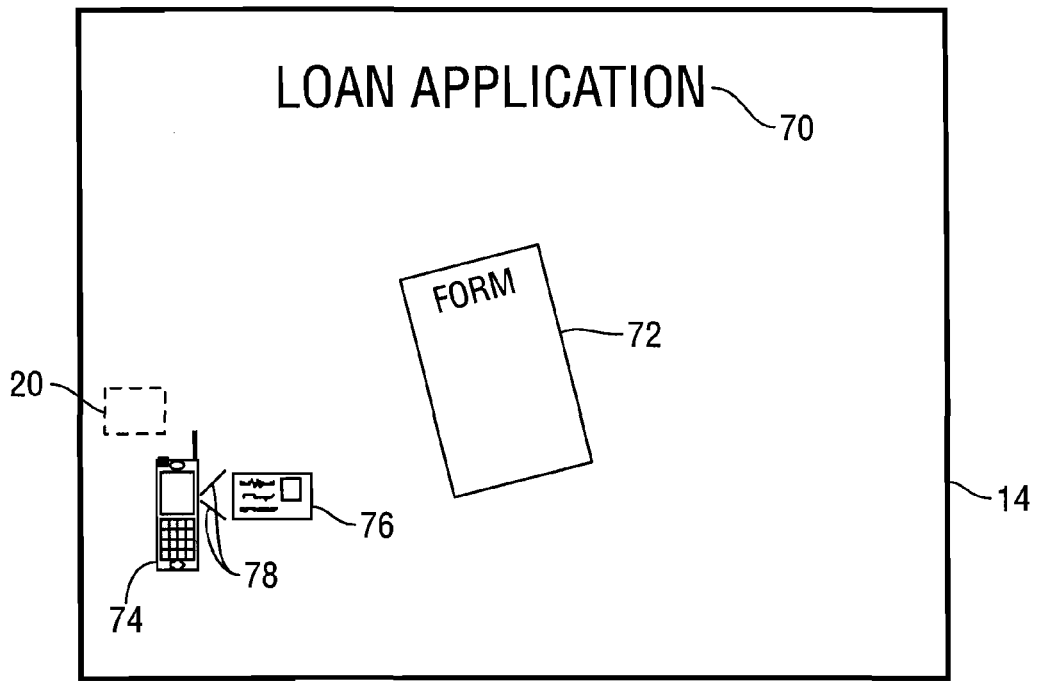
FIG. 4 is a pictorial plan diagram illustrating a customer portable device in contact with the multi-touch computer of FIG. 1 to start populating the application form.
Figure 5:
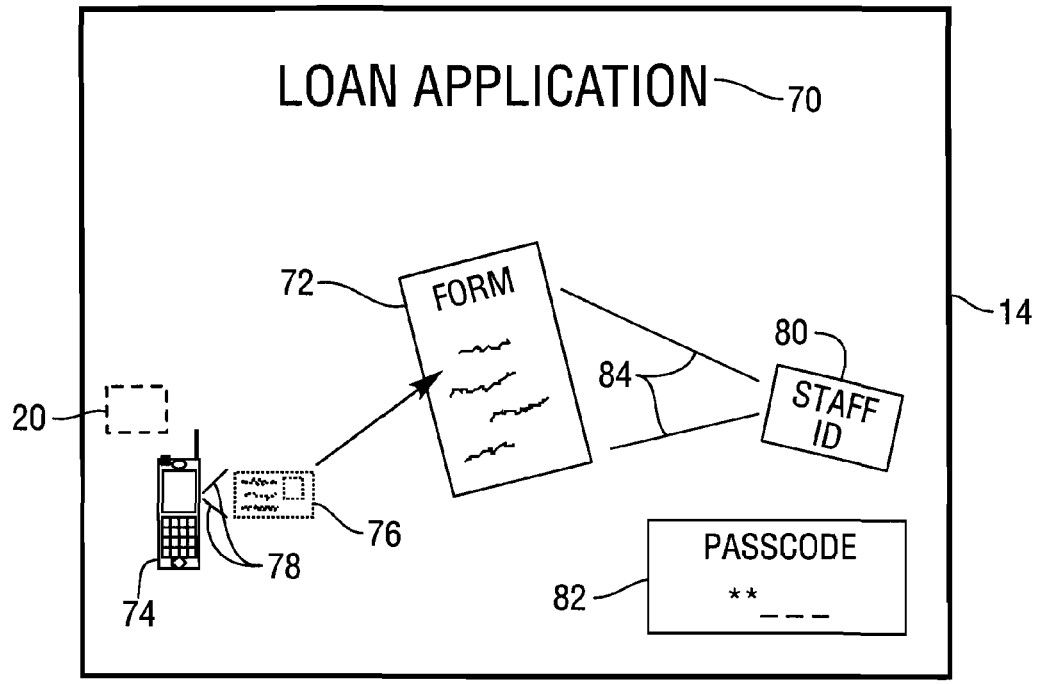
FIG. 5 is a pictorial plan diagram illustrating an authorization portable device in contact with the multi-touch computer of FIG. 1 to complete the application form.

Reference will now be made to FIG. 3, which is a flowchart 100 illustrating steps involved in jointly completing an application form (in this embodiment a loan application form) created by the financial application 54 using the multi-touch computer 10. The flowchart 100 has been split in two (FIGS. 3A and 3B) because it is too large to fit on one sheet of paper. Reference will also be made to FIGS. 4 and 5, which are pictorial plan views at different stages of completing the application form.

In this embodiment, the loan application form is stored in the financial application 54 in the computer 12, but it could be stored in a customer's portable device instead.

Initially, the computer 12 receives a customer selection (step 110) relating to applying for a loan.

The computer 12 then launches the financial application 54 (step 112), which is responsible for creating and populating a loan application form based on a customer's personal data.

The computer 12 then renders a screen on the translucent surface 14 (via the display adapter 34 and the combined projector/position sensor unit 18) identifying the current process as a loan application (using banner text 70) and presenting a visual representation of a loan application form 72 (step 114).

The computer 12 detects any wireless device 74 (in this embodiment a cellular radiofrequency telephone, hereinafter a "cellphone") held by the customer or placed in the vicinity of (including in contact with) the translucent surface 14 (step 116) using the NFC transceiver 20 to create a wireless communication session. The NFC transceiver 20 receives a unique identifier associated with the cellphone 74 (step 118) and conveys this unique identifier to the financial application 54. If there are multiple NFC transceivers 20 in the vicinity of the multi-touch computer 10 (which may occur in a busy bank branch), then the NFC transceiver 20 receives and stores multiple different unique identifiers.

The cellphone 74 includes a barcode (not shown) attached to its rear side having an identification corresponding to the unique identifier conveyed to the NFC transceiver 20. This enables the multi-touch computer 10 to match the cellphone 74 carried by the customer with an NFC communication, as will now be described.

The customer places the cellphone 74 onto the translucent surface 14 to allow the combined projector/position sensor unit 18 to image the cellphone 74, including the barcode (step 120).

The computer 12 then ascertains if the unique identifier (or one of the unique identifiers, if multiple have been received) received by the NFC transceiver 20 matches the barcode read by the combined projector/position sensor unit 18 (step 122) to decide if the cellphone 74 placed on the translucent surface is the same cellphone that created a wireless session with the NFC transceiver 20.

If the unique identifier received by the NFC transceiver 20 does not match the barcode read by the combined projector/position sensor unit 18, then the computer 12 ignores the cellphone 74 (step 124) and the customer can complete the form 72 manually using a keyboard displayed on the translucent surface 14.

However, if the unique identifier received by the NFC transceiver 20 does match the barcode read by the combined projector/position sensor unit 18, then the computer 12 reads personal data from the cellphone 74 (step 126). The cellphone 74 includes software (not shown) that allows the cellphone owner to share private data via an NFC connection, although the cellphone 74 may require a passcode to be entered, or a confirmation button to be pressed, prior to transfer of any personal data.

The computer 12 then renders an image 76 of the personal data on the translucent screen 14 (step 128). This is implemented by the combined projector/position sensor unit 18 displaying a small image 76, approximately business card sized, adjacent the cellphone 74 on the translucent surface 14. The combined projector/position sensor unit 18 displays leader lines 78 from the cellphone 74 to the image 76 to indicate that the image was derived from data in the cellphone 74.

The computer 12 then ascertains (using sensor control application 52) if the customer drags the image 76 onto the loan application form 72 (step 130). If the customer does not drag the image 76 to the form 72, then the computer 12 waits. If the customer does drag the image 76 to the form 72 then the computer 12 populates the form (step 132) using data from the cellphone 74 (as represented by the image 76).

Once this occurs, the computer 12 automatically notifies a member of staff within the bank branch (for example, by instant messaging, email, SMS message, or the like) that a customer at the multi-touch computer 10 needs assistance (step 134).

At this stage, all fields relating to the customer should have been automatically completed using the information from the customer's cellphone 74. However, there are some remaining fields that only an authorized staff member can complete. The form is locked (which means that it cannot be submitted for approval) until such time as these fields are completed by a staff member.

Once a member of staff within the branch receives the message, he/she walks to the multi-touch computer 10 and places an authorization portable device 80 (in the form of an integrated circuit staff identity badge) on the translucent surface 14.

The NFC transceiver 20 wirelessly detects the staff identity badge 80 (step 136) when the badge 80 comes within range of the NFC transceiver 20, and communicates with the staff identity badge 80 to create a wireless communication session. The NFC transceiver 20 receives a unique identifier associated with the badge 80 (step 138).

The badge 80 includes a barcode (not shown) attached to its rear side having an identification corresponding to the unique identifier conveyed to the NFC transceiver 20. When the badge 80 is imaged through the translucent surface 14 (step 140), the computer 12 ascertains if the unique identifier transmitted by the badge 80 and received by the NFC transceiver 20 matches the barcode on the back of the badge 80 read by the combined projector/position sensor unit 18 (step 142) to decide if the badge 80 placed on the translucent surface 14 is the same device that created a wireless session with the NFC transceiver 20.

If the unique identifier received by the NFC transceiver 20 does not match the barcode read by the combined projector/position sensor unit 18, then the computer 12 ignores the badge 80 (FIG. 5) (step 144).

If the unique identifier received by the NFC transceiver 20 does match the barcode read by the combined projector/position sensor unit 18, then the computer 12 displays a passcode input form 82 (FIG. 5) on the translucent surface (step 146) requesting the member of staff to input a passcode to verify his/her identity.

The staff member enters a passcode unique to him/her (in this embodiment, a five digit code), which is compared by the computer 12 with a passcode for that staff member stored in, or accessed by, the financial application 54.

If this passcode is not correct, then the computer 12 ignores the badge 80 (step 144) and the form 72 remains locked.

If this passcode is correct, then the computer 12 populates the form 72 with a code representing the staff member (for example, an employee number) and requests authorization data from the badge 80, which is received via the NFC transceiver 20 (step 150). The authorization data may be an image of the staff member's handwritten signature, a digital signature, a digital certificate, or the like.

The computer 12 uses this received authorization data to populate the remaining fields of the form 72 (step 152), as illustrated in FIG. 5 by leader lines 84.

The financial application 54 then ascertains if all of the fields of the form 72 have been completed (step 154).

If one or more required fields remain incomplete, then the financial application 54 highlights these fields and displays them to the customer for completion using the translucent surface 14 as a touch-sensitive screen (step 156).

If all fields are complete, then the financial application 54 transmits the completed form 72 to a remote host (not shown) for completion of any remaining stages (step 158).

The financial application 54 then offers the customer a printed copy of the completed form 72, and/or offers to email the completed form 72 to the customer, and/or transfer an electronic version of the completed form 72 to the cellphone 74 (step 160).

Various modifications may be made to the above described embodiment within the scope of the invention, for example, in other embodiments various changes may be made to the process. For example, the member of staff may not have to place the badge 80 in contact with the translucent surface 14; the customer may not have to drag the image 76 to the form 72, the form may be completed automatically, and the like.

In other embodiments additional peripherals may be coupled to the computer 12. For example, a card reader may be coupled to allow a customer or an authorized user to insert a card containing (i) data for use in populating a form, (ii) additional form templates, (iii) additional transaction options, or the like. As another example, an encrypting keypad may be coupled to the computer 12 to allow secure entry of data, such as a PIN (personal identification number).

In other embodiments, a multi-touch surface may be based on other technologies, for example, those available from Perceptive Pixel, Inc. (trade mark), 111 Eighth Avenue, 16th Floor, New York, N.Y. 10011.

In other embodiments, a communications facility other than NFC, for example 802.11b or Bluetooth (trade mark), may be provided. Alternatively, the communications facility may be a wired rather than wireless communication facility, such as USB or RS232.

In other embodiments, an interactive computing device in a form other than a table may be provided. For example, the interactive computing device may be a multi-touch surface mounted vertically in a similar way to a chalk board.

In other embodiments the customer or staff member may not be required to place their portable device in the vicinity of the translucent surface. The wireless communications may be relied on to transmit information.

In other embodiments, the multi-touch surface may be transparent or opaque. Technologies other than projection may be used to render text and images on the multi-touch surface.

In other embodiments, a financial application other than a loan may be provided (for example, opening a savings account or an investment account), or an application other than a financial application may be provided (for example, registering with a public authority for a driver license, a birth, a marriage, or the like).

In other embodiments, the multi-touch computer may display a menu of options in the vicinity of the customer's portable device, when the customer's portable device is placed on the translucent surface. The menu of options may include: transfer personal information from the business card to a form, transfer a completed form from the multi-touch computer to the customer's portable device, transfer a blank (or partly complete) form from the customer's portable device to the multi-touch computer, and the like.

In other embodiments, different transactions may be implemented. For example, a cash withdrawal transaction may be pre-staged, checks to be deposited may be imaged, or the like.

In other embodiments, the application form may be stored on a customer's portable device prior to the customer arriving at the branch. The application form may be transferred from the customer's portable device to the multi-touch computer on arriving at the branch using the multi-touch computer.

In other embodiments, maintenance personnel may place a portable device on the multi-touch computer to access a menu of options relating to servicing and maintenance functions for the multi-touch computer.

In other embodiments the data may be stored on the network rather than (or in addition to) the personal portable device.

In other embodiments, visual indicators other than barcodes may be provided on the customer and/or authorization portable devices.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

What is claimed is:

1. Apparatus for enabling a bank customer and a bank staff member at a bank branch to jointly and interactively complete an electronic financial application form during a single financial transaction at the bank branch, the apparatus comprising:
   a computer;
   a multi-touch surface in communication with the computer;
   a sensor unit coupled between the multi-touch surface and the computer and for obtaining a barcode associated with a portable device which has been placed on the multi-touch surface; and
   a communication facility coupled to the computer and for communicating between the computer and portable devices in the vicinity of the multi-touch surface;
   wherein the computer includes a financial application arranged to (i) receive data transferred from a bank staff member's second portable device via the multi-touch surface, and (iii) create an electronic financial application form populated with data received from both the bank customer's first portable device and the bank staff member's second portable device during the single financial transaction using the same multi-touch surface; and
   wherein (i) the communication facility wirelessly communicates with a number of portable devise in the vicinity of the communication facility to receive at a first time unique identifiers associated with the number of portable devices, (ii) the computer ascertains if one of the unique identifiers received at the first time from the number of portable devices in the vicinity of the communication facility matches a barcode obtained by the sensor unit and associated with the bank customer's first portable device, and (iii) the computer presents the bank customer with the electronic financial application form via the multi-touch surface when there is a match between one of the unique identifiers received at the first time from the number of portable devices in the vicinity of the communication facility and the barcode obtained by the sensor unit and associated with the bank customer's first portable device.

2. Apparatus according to claim 1, wherein the communication facility comprises a near-field communications (NFC) wireless transceiver.

3. Apparatus according to claim 2, wherein the NFC wireless transceiver comprises a contactless smart card reader.

4. Apparatus according to claim 1, wherein the communication facility comprises a short range radio frequency (RF) transceiver.

5. Apparatus according to claim 1, wherein the communication facility wirelessly communicates with the number of portable devices in the vicinity of the communication facility before the bank customer places the bank customer's first portable device on or near the multi-touch surface.

6. Apparatus according to claim 5, wherein (i) the communication facility wirelessly communicates with a number of portable devices in the vicinity of the communication facility to receive at a second time unique identifiers associated with the number of portable devices after the bank customer has placed the bank customer's first portable device on or near the multi-touch surface, (ii) the computer ascertains if one of the unique identifiers received at the second time from the number of portable devices in the vicinity of the communication facility matches a barcode obtained by the sensor unit and associated with the bank staff member's second portable device, and (iii) the computer presents the bank staff member with an electronic passcode input form via the multi-touch surface to allow the bank staff member to enter a passcode when there is a match between one of the unique identifiers received at the second time from the number of portable devices in the vicinity of the communication facility and the barcode obtained by the sensor unit and associated with the bank staff member's second portable device.

7. A method of operating a computing device including a multi-touch surface located at a bank branch to enable a bank customer carrying a first portable device and a bank staff member carrying a second portable device to jointly and interactively complete an electronic financial application form during a single financial transaction at the bank branch, the method comprising:
wirelessly communicating with a number of portable devices in the vicinity of the communication facility to receive at a first time a number of unique identifiers associated with the number of portable devices;
obtaining a barcode associated with the bank customer's first portable device which has been placed on or near the multi-touch surface;
electronically by a computer, ascertaining if one of the unique identifiers received at the first time from the number of portable devices in the vicinity of the communication facility matches the barcode associated with the bank customer's first portable device;
electronically by a computer, presenting the bank customer with the electronic financial application form via the multi-touch surface when there is a match between one of the unique identifiers received at the first time from the number of portable devices in the vicinity of the communication facility and the barcode associated with the bank customer's first portable device;
transferring data from the bank customer's first portable device placed on or near the multi-touch surface to the electronic financial application form which has been presented via the multi-touch surface to at least partially complete the electronic financial application form during the single financial transaction;
electronically by a computer, notifying the bank staff member to enable the bank staff member carrying the second portable device to assist the bank customer in completing the electronic financial application form; and
transferring data from the bank staff member's second portable device placed on or near the multi-touch surface to the electronic financial application form to complete the electronic financial application form which has been at least partially completed by data transferred from the bank customer's first portable device during the single financial transaction using the same multi-touch surface.

8. A method according to claim 7, wherein wirelessly communicating with the number of portable devices in the vicinity of the communication facility is before the bank customer placing the bank customer's first portable device on or near the multi-touch surface.

9. A method according to claim 7, further comprising:
wirelessly communicating with a number of portable devices in the vicinity of the communication facility to receive at a second time unique identifiers associated with the number of portable devices after the bank customer has placed the bank customer's first portable device on or near the multi-touch surface;
obtaining a barcode associated with the bank staff member's second portable device which has been placed on or near the multi-touch surface;
electronically by a computer, ascertaining if one of the unique identifiers received at the second time from the number of portable devices in the vicinity of the communication facility matches the barcode associated with the bank staff member's second portable device; and
electronically by a computer, presenting the bank staff member with an electronic passcode input form via the multi-touch surface to allow the bank staff member to enter a passcode when there is a match between one of the unique identifiers received at the second time from the number of portable devices in the vicinity of the communication facility and the barcode associated with the bank staff member's second portable device.

10. A method according to claim 9, wherein wirelessly communicating with the number of portable devices in the vicinity of the communication facility is before the bank staff member placing the bank staff member's second portable device on or near the multi-touch surface.

11. A method according to claim 7, wherein electronically by a computer, presenting the bank customer with the electronic financial application form via the multi-touch surface is implemented by the multi-touch surface displaying a representation of the electronic financial application form on a portion of the multi-touch surface.

12. A method according to claim 7, wherein the bank customer's first portable device comprises a cellular radio frequency telephone.

13. A method according to claim 7, wherein the bank staff member's second portable device comprises an integrated circuit card.

14. A method according to claim 7, wherein the bank customer's first portable device includes a sharing facility to allow the bank customer to populate personal information on a template that can be transferred by the bank customer to the electronic financial application form.

15. A method according to claim 7, wherein at the first time, transferring data from the bank customer's first portable device placed on or near the multi-touch surface to the electronic financial application form is implemented by the multi-touch surface displaying an image of a template containing personal information and transferring data from the image to the electronic financial application form in response to the bank customer dragging the image to an image of the electronic financial application form.

16. A method according to claim 7, wherein at the second time which is after the first time, transferring data from the bank staff member's second portable device placed on or near the multi-touch surface to the electronic financial application form includes verifying a claimed identity of the bank staff member's second portable device.

17. A method according to claim 7, further comprising:
  validating that the electronic financial application form has been completed by checking that every required field has been completed.

\* \* \* \* \*